United States Patent [19]
DePietro

[11] Patent Number: 5,890,683
[45] Date of Patent: Apr. 6, 1999

[54] TUBE HANGER

[75] Inventor: Mark A. DePietro, Canton, Ohio

[73] Assignee: Diebold, Incorporated, North Canton, Ohio

[21] Appl. No.: 800,932

[22] Filed: Feb. 13, 1997

[51] Int. Cl.[6] .................................................. E21F 17/02
[52] U.S. Cl. ........................................... 248/58; 248/74.3
[58] Field of Search ................................. 248/58, 59, 62, 248/73, 74.3, 327; D8/373, 380

[56] References Cited

U.S. PATENT DOCUMENTS

| | | | |
|---|---|---|---|
| D. 390,775 | 2/1998 | DePietro | D8/373 |
| 521,149 | 6/1894 | Boyd . | |
| 525,891 | 9/1894 | Fricke . | |
| 576,339 | 2/1897 | Clayton . | |
| 661,604 | 11/1900 | Grabler . | |
| 1,320,828 | 11/1919 | Bilbrough . | |
| 1,522,979 | 1/1925 | Ratigan . | |
| 1,588,172 | 6/1926 | Crocker . | |
| 1,804,472 | 5/1931 | Leslie . | |
| 2,319,832 | 5/1943 | Trochim | 248/60 |
| 2,570,957 | 10/1951 | Lee | 248/71 |
| 2,665,950 | 1/1954 | Johnson | 304/2 |
| 2,854,824 | 10/1958 | Curry et al. | 61/45 |
| 2,862,368 | 12/1958 | Dempsey | 61/45 |
| 3,016,220 | 1/1962 | Rose | 248/74 |
| 3,136,515 | 6/1964 | Potruch | 248/62 |
| 3,218,012 | 11/1965 | Volpe | 248/62 |
| 3,273,837 | 9/1966 | Willert et al. | 248/59 |
| 3,279,300 | 10/1966 | Larson | 85/28 |
| 3,355,132 | 11/1967 | Jenkins | 248/59 |
| 3,430,905 | 3/1969 | Pepe | 248/74 |
| 3,559,910 | 2/1971 | Babb | 248/59 |
| 3,888,439 | 6/1975 | Tuttle | 248/54 R |
| 4,032,096 | 6/1977 | Perrault et al. | 248/73 |
| 4,042,198 | 8/1977 | Takeuchi | 248/62 |
| 4,254,930 | 3/1981 | Warren | 248/542 |
| 4,260,123 | 4/1981 | Ismert | 248/74 R |
| 4,407,478 | 10/1983 | Hodges | 248/542 |
| 4,588,152 | 5/1986 | Ruehl et al. | 248/71 |
| 4,826,111 | 5/1989 | Ismert | 248/49 |
| 4,840,334 | 6/1989 | Kikuchi | 248/73 |
| 4,842,237 | 6/1989 | Wollar | 248/548 |
| 4,903,920 | 2/1990 | Merritt | 248/71 |
| 4,936,530 | 6/1990 | Wollar | 248/71 |
| 4,961,554 | 10/1990 | Smowton | 248/68.1 |
| 4,971,272 | 11/1990 | Gudridge et al. | 248/74.5 |
| 4,978,090 | 12/1990 | Wichert et al. | 248/74.1 |
| 5,054,741 | 10/1991 | Ismert | 248/74.5 |

*Primary Examiner*—Ramon O. Ramirez
*Assistant Examiner*—Willie Berry, Jr.
*Attorney, Agent, or Firm*—D. Peter Hochberg

[57] ABSTRACT

Support device for suspending pipes or tubes from a support surface. The support device is capable of supporting a plurality of tubes or pipes of varying size, and is capable of supporting pipes and/or tubes running transverse to each other.

15 Claims, 6 Drawing Sheets

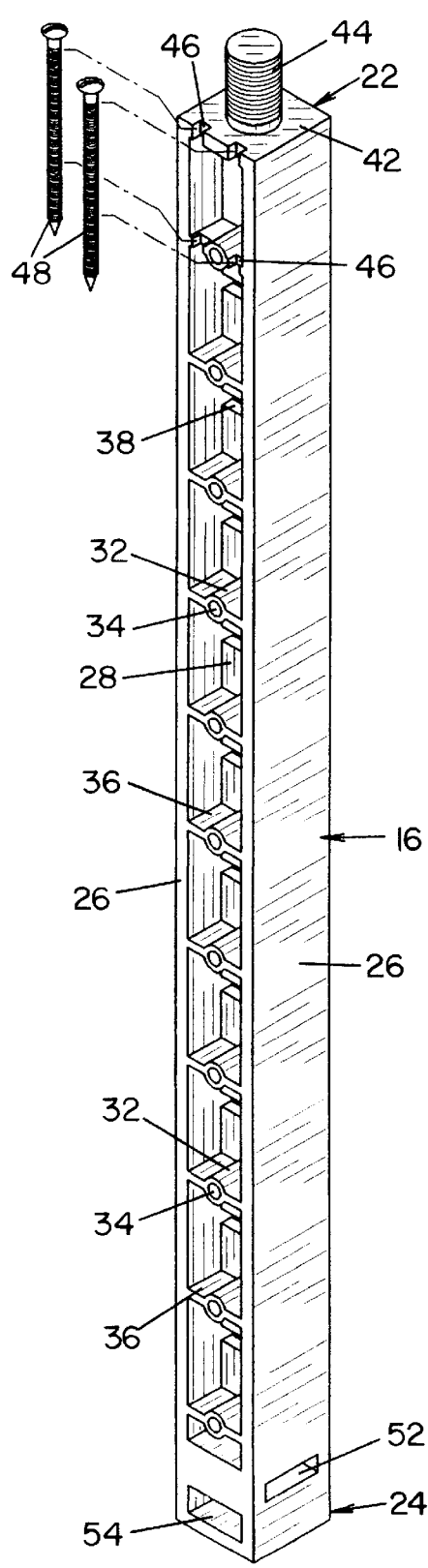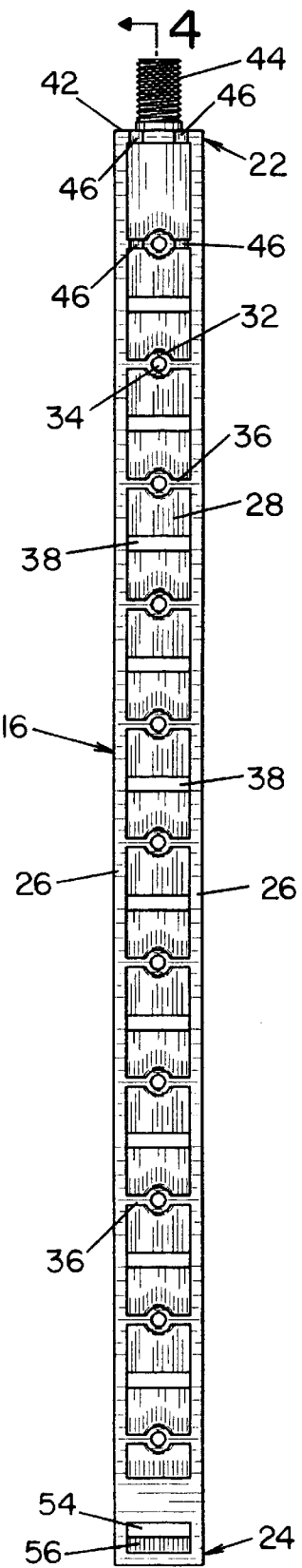

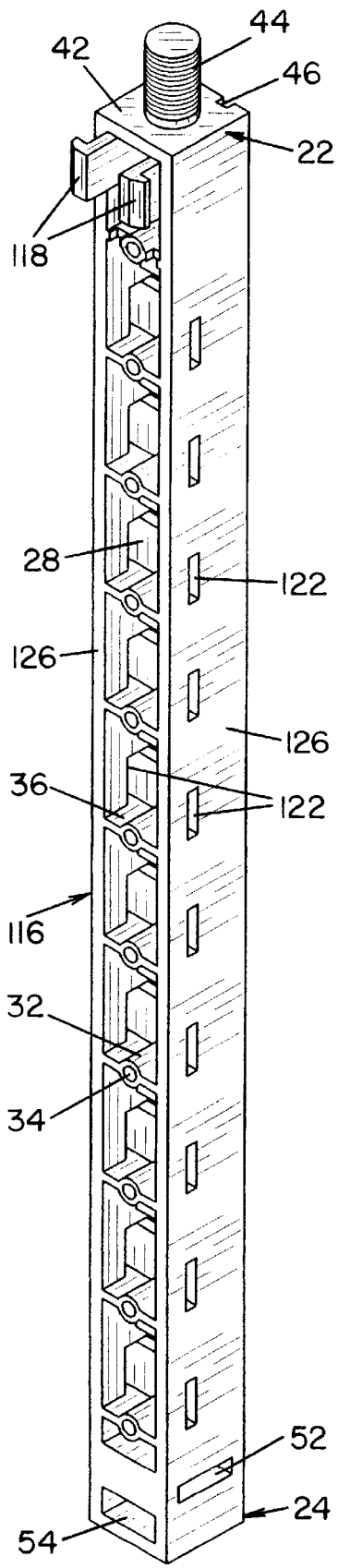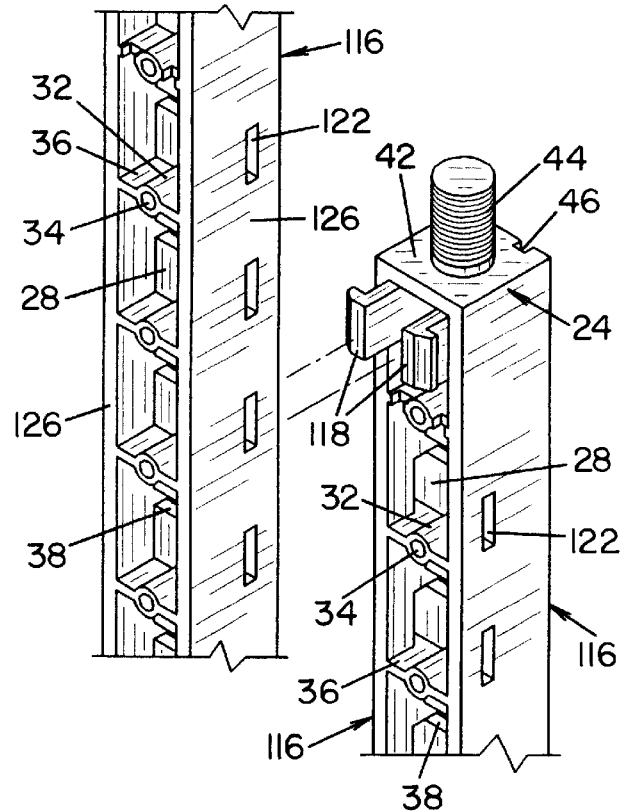
FIG. 7
FIG. 8

TUBE HANGER

FIELD OF THE INVENTION

The present invention relates generally to support devices for supporting structural members, and more specifically, to a hanger for suspending pipes or tubes from a support surface.

BACKGROUND OF THE INVENTION

Pipes or tubes in residential and commercial installations are generally mounted to support structures such as walls, under-floor joists or structural members. In plumbing installations, pipes are often supported by the use of a strap hanger which is comprised of a length of perforated metal which is bent around the pipe and nailed to an under-floor joist or wall. More recently, numerous other types of pipe hangers have been marketed. Most of these devices are formed to support a single pipe or tube, or are designed to support a single pipe or tube of a specific size (i.e., diameter). Moreover, many existing types of pipe and tube hangers are designed for mounting to under-floor joists or walls, but do not lend themselves to attachment to structural metal beams.

The present invention overcomes these and other problems and provides a tube or pipe hanger capable of supporting a plurality of tubes or pipes of varying size, which is capable of supporting pipes and/or tubes running transverse to each other.

SUMMARY OF THE INVENTION

In accordance with the present invention, there is provided a hanger for suspending at least one cylindrical member from a support, said hanger comprising an elongated body member having spaced apart parallel walls extending along the length of the body. A central web is provided to connect the wall members to each other. Spaced apart slots are formed through the web. A plurality of spaced apart tubular sleeves are formed through the web, the sleeves being generally perpendicular to the web and parallel to the side walls. An attachment member is formed at one end of the body member. The attachment member is fastenable to a device for attaching the body member to a structural metal beam.

In accordance with another aspect of the present invention, a flexible strap is provided to extend through said slots formed through said web, said strap forming a loop for supporting and securing a pipe to said hanger.

It is an object of the present invention to provide a hanger for suspending at least one elongated cylindrical member from a structural support.

Another object of the present invention is to provide a hanger as described above which may be attached to a wall, wooden floor joist, or metal structural beams.

Another object of the present invention is to provide a hanger as described above which is adaptable for supporting a plurality of different sized cylindrical members.

A still further object of the present invention is to provide a hanger as described above, wherein more than one cylindrical member may be simultaneously supported thereon.

A still further object of the present invention is to provide a hanger as described above, wherein more than one cylindrical member may be supported thereon, and wherein said cylindrical members may be positioned transverse to each other.

A still further object of the present invention is to provide a hanger as described above having a surface member enabling one hanger to be attached to another to extend the overall length of a hanger.

An even further object of the present invention is to provide a hanger as described above, wherein two like hangers may be attached to each other in snap-lock fashion.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 2 is an enlarged perspective view of the hanger shown in FIG. 1;

FIG. 3 is a side elevational view of the hanger shown in FIG. 1;

FIG. 7 is a perspective view of a tube hanger illustrating an alternate embodiment of the present invention; and FIG. 8 is a perspective view showing how two hangers as shown in FIG. 7 may be attached to each other.

DETAILED DESCRIPTION OF PREFERRED EMBODIMENT

Figure 1:
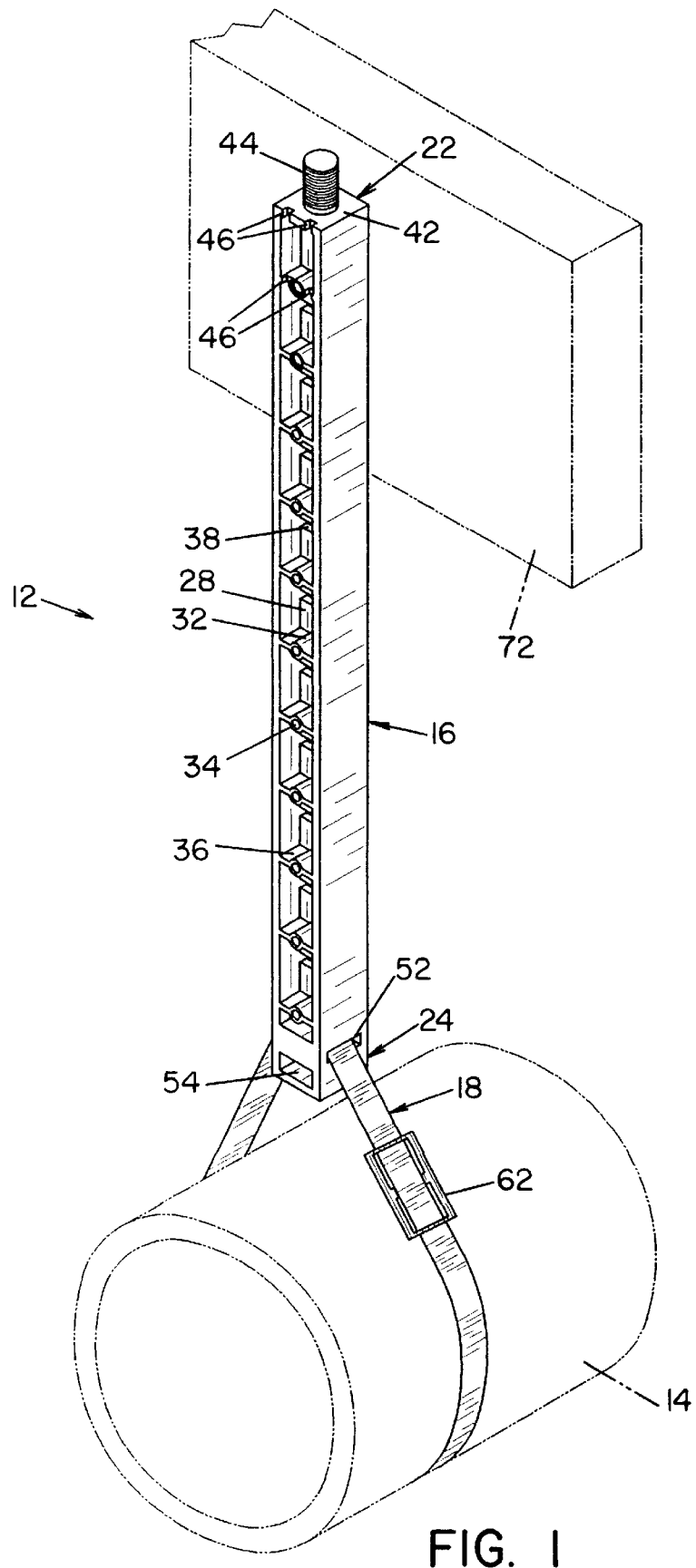
FIG. 1 is a perspective view of a tube hanger illustrating a preferred embodiment of the present invention showing such hanger secured to a floor joist supporting a tube.
Figure 4:
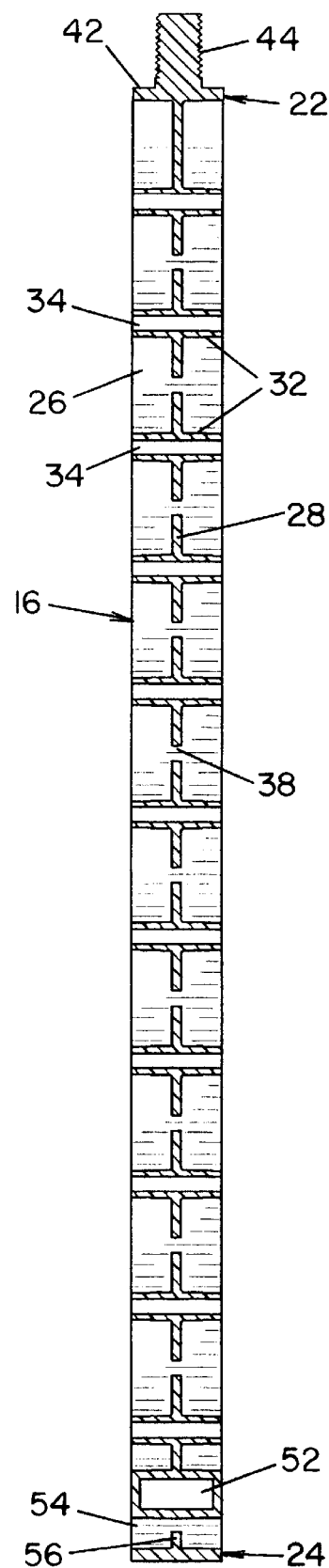
FIG. 4 is a sectional view taken along lines 4—4 of FIG. 3.

Referring now to the drawings wherein the showings are for the purpose of illustrating preferred embodiments of the invention only, and not for the purpose of limiting same, FIG. 1 shows a hanger 12 for supporting cylindrical members 14, such as pipes or tubes, illustrating a preferred embodiment of the present invention.

Hanger 12 is generally comprised of a generally prismatic elongated beam 16 and a flexible strap 18. Beam 16 includes an upper end 22 and a lower end 24. Beam 16 is generally comprised of a pair of spaced apart flanges (walls) 26 connected at their midpoints by a web 28. A plurality of spaced apart tubular members 32 extend through web 28. Tubular members 32 are generally perpendicular to web 28 and parallel to flanges 26. Tubular members 32 define inner bores 34 which extend therethrough. Reinforcing walls 36 extend out from tubular members 32 to flanges 26 as best seen in FIGS. 2 and 3. A plurality of spaced apart slots 38 are formed in web 28. A slot 38 is disposed between each tubular member 32. Upper end 22 of beam 16 includes an end plate 42 having a threaded member 44 extending therefrom. Threaded member 44 is oriented along the axis of beam 16. Recesses 46 are formed in end plate 42 and in the reinforcing walls 36 adjacent to end plate 42. Recesses 46 are dimensioned to receive a pair of fasteners 48 in snap-lock fashion. Fasteners may be nails or screws which are used to fasten beam 16 to a support surface or to another beam 16 as will be described in greater detail below.

Lower end 24 is formed to include a first opening 52 which generally extends from the surface of one flange 26 to the surface of the other flange 26. A second opening 54 is formed in lower end 24 below first opening 52. Second opening is generally transverse to first opening 52 as best seen in FIG. 2. A rib 56 is formed within second opening 54.

Beam 16 as heretofore described is preferably formed of a tough plastic material, such as nylon, and more preferably ABS.

Beam 16 as heretofore described is intended for use with a flexible strap 18 which is used to support a cylindrical member 14 therefrom. Strap 18 is preferably formed of a woven fabric material, and includes a buckle or cinch 62 for securing strap 18. According to the present invention, strap 18 may be located through either first opening 52, second opening 54 or slots 38 to secure a cylindrical member 14 to beam 16. In this respect, FIG. 1 shows a typical installation utilizing hanger 12, wherein beam 16 is attached to a floor joist shown in phantom in FIG. 1 and designated 72. Beam 16 is attached to wooden floor joist 72 by means of fastener 48 (not shown in FIG. 1). Fastener 48 extends through bores 34 of tubular member 32 as threaded into wooden floor joist 72 to mount beam 16 thereto. Flexible strap 18 extends through first opening 52 to form a loop to support cylindrical member 14. Importantly, the "play" or "slop" of flexible strap 18 allows cylindrical member 14 to be oriented in positions other than that shown in FIG. 1. In other words, the loop defined by strap 18 allows cylindrical member 14 to be oriented in a number of positions relative to beam 16, while still providing support for the weight of cylindrical member 14.

Figure 5:
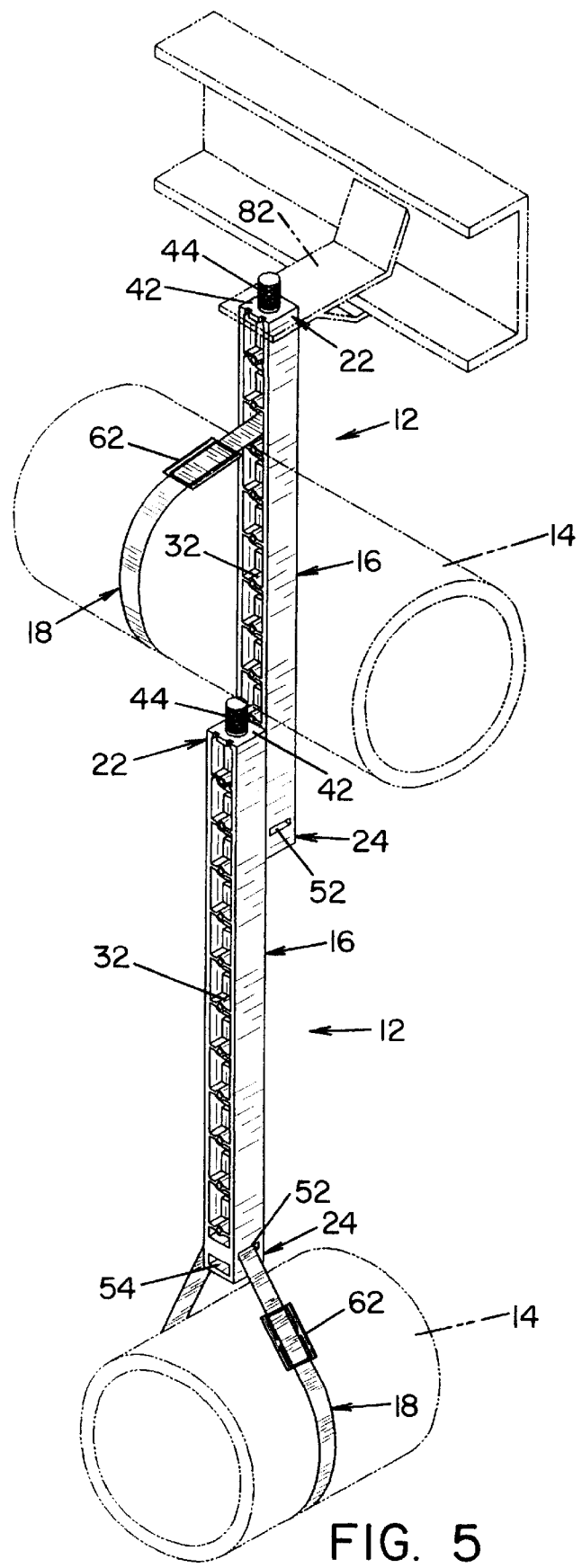
FIG. 5 is a perspective view showing two hangers as shown in FIG. 1 attached together, mounted to a structural metal member and supporting two tubes.
Figure 6:
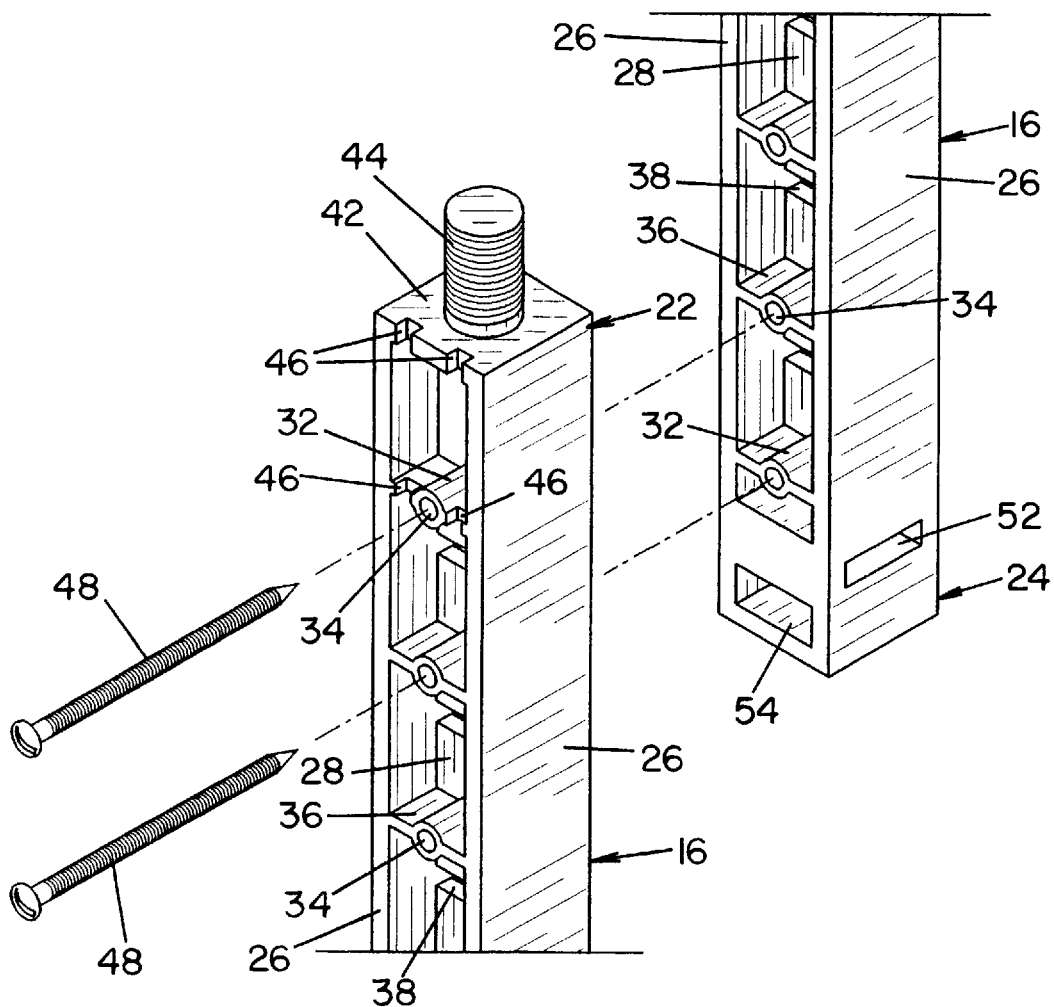
FIG. 6 is an enlarged view showing how two hangers are secured to each other.

Referring now to FIG. 5, several applications for hanger 12 are illustrated. FIG. 5 shows an elongated support structure formed from two joined hangers 12. This elongated support structure is formed by securing two hangers 12 to each other. Hangers 12 may be joined to each other by aligning tubular members 32 on one hanger 12 with tubular members 32 on another hanger 12. Fasteners 48 (not shown in FIG. 5) may be used to secure one hanger 12 to the other, as best seen in FIG. 6. In this respect, fasteners 48 are preferably dimensioned relative to bores 34 to tubular members 32 to be self-tapping. In this respect, fasteners 48, shown as screws in FIG. 6, would in effect be self-tapping into the molded plastic bores 34 of beam 16. By securing one beam 16 to another, an elongated support structure as shown in FIG. 5 can be provided where necessary. FIG. 5 also illustrates how multiple cylindrical members 14 may be mounted to a beam 16. In this respect, lower cylindrical member 14 in FIG. 5 is mounted with flexible strap 18 extending through first opening 52 in lower beam 16. A second upper cylindrical member 14 is support to upper beam 16 by means of flexible strap 18 extending through slots 38. FIG. 5 thus illustrates how a plurality of cylindrical members 14 may be mounted to one or more beams 16, and how such member can be oriented transverse to each other. Further, as indicated above, the slack in the loop defined by flexible strap 18 enables cylindrical members 14 to be oriented in an infinite number of positions relative to each other. Still further, FIG. 5 illustrates a beam 16 being mounted to a clamp 82, which is attachable to a structural steel beam. In FIG. 5, the elongated support structure is shown attached to a pipe clamp, which in turn is supported by a structural metal C-channel. Beam 16 is attached to clamp 82 by means of threaded member 44 being threaded into a mating threaded bore in clamp 82. Threaded member 44 is dimensioned to be slightly larger than the standard threaded bore size in conventional beam clamps. In this respect, threaded member 44 is tightly received in the threaded bore of clamp 82 and no additional fastening element, such as a retaining nut, are required to maintain the attachment of beam 16 to clamp 82.

Referring now to FIGS. 7 and 8, an alternate embodiment of the present invention is shown. In FIG. 7, a beam 116 is shown. Beam 116 is similar in many respects to beam 16 shown in FIGS. 1–6, and like elements are designated with like reference numbers. Beam 116 has been modified, however, to include outward extending, generally J-shaped tabs 118 at the upper end of beam 116. Tabs 118 are dimensioned to be received in slots 122 formed in flanges 126. Slots 122 are dimensioned to receive J-shaped tabs 118 in snap-lock fashion. As illustrated in FIGS. 7 and 8, beam 116 may be modified to facilitate attachment of one beam to another in snap-lock fashion.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A hanger for supporting at least one pipe or tube from a support, said hanger comprising:

a generally prismatic elongated body member formed by spaced apart parallel flange walls which are connected to each other by a web extending along the length of said body;

spaced apart slots extending through said web between said walls;

spaced apart tubular members formed through said web, said members being parallel to each other and perpendicular to said web and including inner cylindrical surfaces defining inner bores extending therethrough, said inner bores dimensioned to receive fastening means for fastening one hanger to another hanger or for fastening the hanger to a support surface, said inner cylindrical surfaces being comprised of a material that can be self tapped by said fastening means; and an attachment member formed at one end of said body for attachment to a device connectable to structural beams.

2. A hanger according to claim 1, wherein said hanger further comprises reinforcing walls extending out from said tubular members to each of said flange walls.

3. A hanger according to claim 1, and further including recess means dimensioned to receive and store said fastening means.

4. A hanger according to claim 1, wherein said hanger further comprises a securing means for securing said at least one pipe or tube to said hanger.

5. A hanger according to claim 4, wherein said hanger further comprises at least one opening at an end of said body opposite said attachment member, said at least one opening dimensioned to receive said securing means.

6. A hanger according to claim 5, wherein said securing means is a strap.

7. A hanger according to claim 1, wherein said hanger further comprises:

spaced apart slots extending through said flange walls; and tab means for attaching one hanger to a second hanger, said tab means dimensioned to be received by said slots extending through said flange.

8. A hanger according to claim 1, wherein said attachment member is a threaded member oriented along the axis of said body member and attachable with said device connectable to structural beams.

9. A hanger for supporting at least one pipe or tube from a support, said hanger comprising:

a body member formed by spaced apart body wall means connected to each other by a web means extending along the length of the body member;

a plurality of slot means extending through said web means between said wall means;

a plurality of tubular members formed through said web means, said tubular members extending generally parallel to each other and generally perpendicular to said web means;

means for attaching said hanger to a support structure;

spaced apart slots extending through said wall means; and tab means for attaching one hanger to a second hanger, said tab means dimensioned to be received by said slots extending through said wall means, said tab means being resilient so that said tab means can be compressed and pushed through said wall means to said slots during attachment of one hanger to the second hanger, wherein said tab means expands and inserts itself into said slots upon reaching said slots.

10. A hanger according to claim 9, wherein said hanger further comprises reinforcing wall means extending out from said tubular members to each of said body wall means.

11. A hanger according to claim 9, wherein said plurality of tubular members define bore means extending therethrough, said bore means dimensioned to receive fastening means for fastening one hanger to another hanger or for fastening the hanger to a support surface.

12. A hanger according to claim 9, wherein said hanger further comprises securing means for securing said at least one pipe for tube to said hanger.

13. A hanger according to claim 12, wherein said hanger further comprises at least one opening dimensioned to receive said securing means.

14. A hanger according to claim 13, wherein said securing means is a strap means.

15. A hanger according to claim 9, wherein said attachment member is a threaded member oriented along the axis of said body member and attachable with said device connectable to structural beams.

* * * * *